L. SOCHUREK.
FILTER PULP WASHER.
APPLICATION FILED SEPT. 2, 1909.
945,871.
Patented Jan. 11, 1910.
2 SHEETS—SHEET 2.
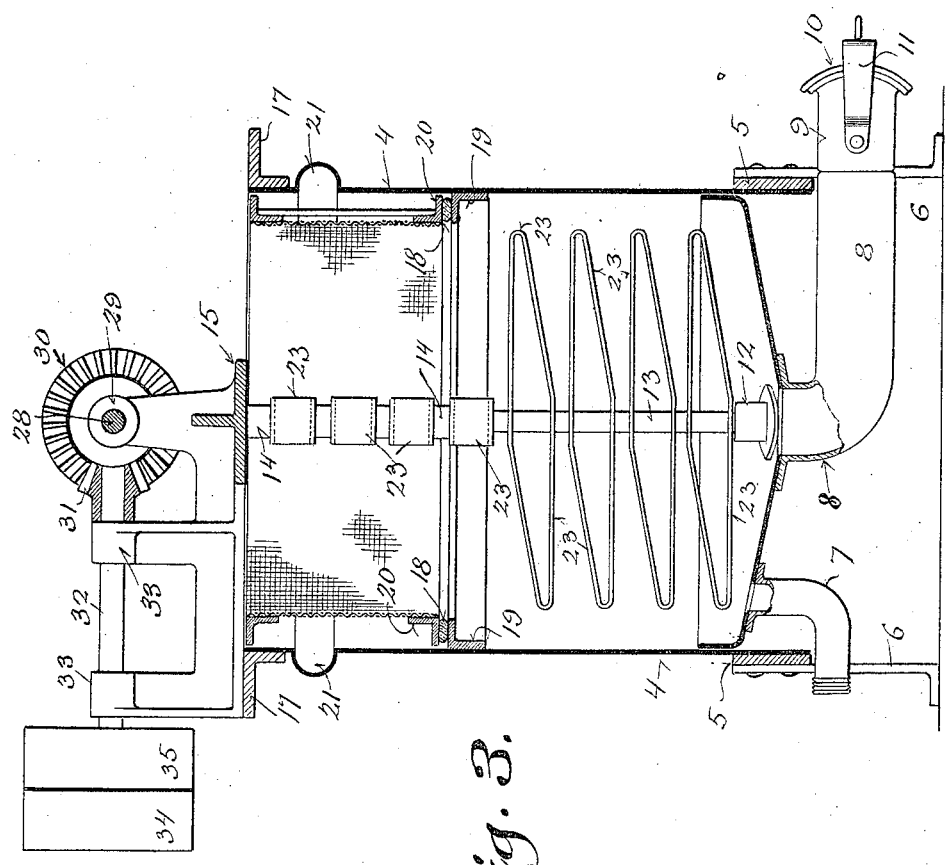

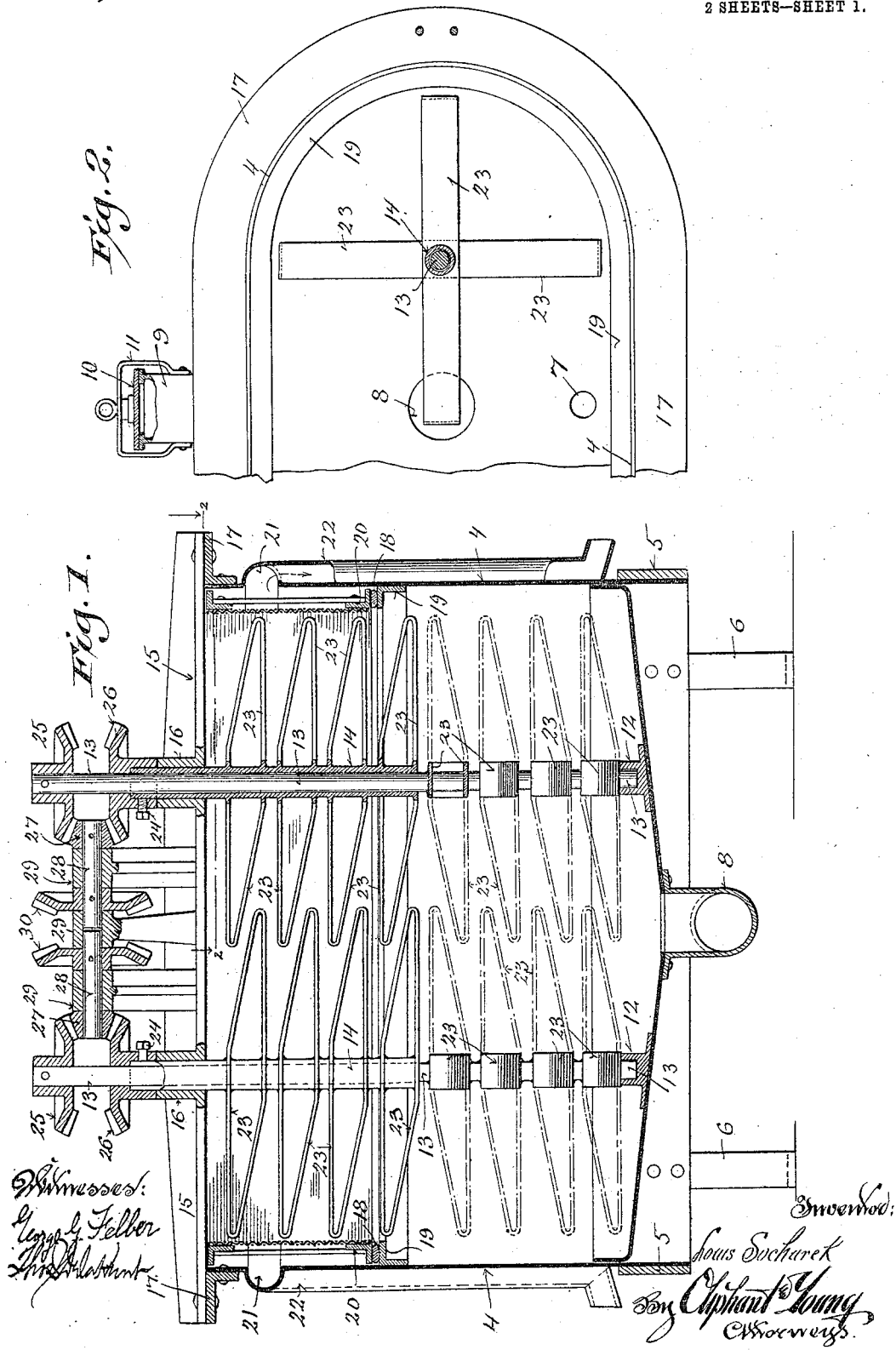

UNITED STATES PATENT OFFICE.

LOUIS SOCHUREK, OF MILWAUKEE, WISCONSIN.

FILTER-PULP WASHER.

945,871.

Specification of Letters Patent. Patented Jan. 11, 1910.

Application filed September 2, 1909. Serial No. 515,935.

*To all whom it may concern:*

Be it known that I, LOUIS SOCHUREK, a citizen of the United States, and resident of Milwaukee, in the county of Milwaukee and State of Wisconsin, have invented certain new and useful Improvements in Filter-Pulp Washers; and I do hereby declare that the following is a full, clear, and exact description thereof.

My invention consists in what is herein particularly set forth with reference to the accompanying drawings and pointed out in claims, its object being to provide simple, economical and efficient machines for rapid washing of filter pulp.

Figure 1 of the drawings represents a for the most part vertical longitudinal section view of a washing machine in accordance with my invention, certain of the parts being in elevation; Fig. 2, a plan view of a fragment of the machine partly in horizontal section, as indicated by lines 2—2 in Fig. 1, a strainer constituting part of the machine being removed, and Fig. 3, a transverse section view of said machine.

Referring by numerals to the drawings, 4 indicates a dished bottom horizontally elliptical tank having an outer lower band 5 to which legs 6 are attached. The bottom of the tank is provided with a water inlet pipe 7, and a drain-pipe 8 connects with the lower central portion of said bottom. The outlet end of the drain-pipe is provided with a nozzle 9 controlled by a gate 10 hung in connection with a bail 11 that is pivotally attached to said nozzle.

Fast on the tank-bottom are socket-bearings 12 in which a pair of vertical shafts 13 are stepped, and these shafts extend through sleeves 14 for which an angular frame 15, supported on the tank, is provided with bearings 16, said frame being riveted or otherwise rigidly connected to an upper horizontal flange 17 of said tank.

Set on a gasket 18 upon a horizontal flange 19 within the tank is a strainer 20 and leading from an upper channel 21 of said tank are pipes 22 for overflow water. The strainer comprises a frame of any suitable construction and wire gauze in connection with the frame.

Secured to the shafts 13, below the sleeves 14, and to the sleeves themselves, are blades 23 parallel in series, and these blades extend in opposite directions from said shafts and sleeves to therewith constitute stirrers for the material to be treated in the tank.

Fastened by set-screws 24, or other suitable means to the upper ends of the shafts and sleeves are bevel-gear wheels 25 and 26 that mesh with bevel-gear pinions 27 fast on spindles 28 for which the frame 15 is provided with bearings 29. Bevel-gear wheels 30 fast on the spindles are meshed with a bevel-gear pinion 31 fast on a drive-shaft 32 for which bearings 33 are provided on the frame 15, and the drive-shaft is provided with fast and loose belt-pulleys 34, 35.

Each of the blades 23 is herein shown as being preferably a suitably bent flat metal strip of any preferred width, the contour of said blade in side elevation being approximately that of a rhomboid, and the gearing above specified is such that the blade-carrying shafts and sleeves rotate in opposite directions. The length, shape and disposition of the blades is such that the series of same in connection with the shafts pass one another twice in one revolution of said shafts alternately with a similar passing of the series in connection with the sleeves, the stirring and cutting action of the shaft-blades being in a direction opposite that of the sleeve-blades to divide the strain and secure the best results.

The filter pulp to be cleaned is placed in the tank 4, water let on through the pipe 7 and the mass agitated and cut by the stirrers, the blades of which stirrers cut the pulp until it is thoroughly disintegrated. The strainer 20 prevents loss of pulp with the overflow water that finds its outlet through the pipes 22, and the disintegrated and cleaned pulp is run off with water from time to time through the drain-pipe 8 to be thereafter separated from said water, whereby it is again in condition for use as a filter.

I claim:

1. A filter-pulp washer comprising a horizontally elliptical tank provided with a suitably controlled drain-pipe, a pair of vertical shafts for which bearings are provided on the bottom of the tank, a frame mounted on said tank, depending sleeves for which the frame is provided with bearings and through which sleeves the shafts extend, blades connected in series to the shafts and sleeves to extend therefrom in opposite directions, and gearing by which said shafts and sleeves are rotated in opposite directions; the length and disposition of the blades being such that the series of same in connection with shafts pass one another twice in each revolution thereof alternately with a similar passing of the series in connection with sleeves.

2. A filter-pulp washer comprising a horizontally elliptical tank provided with a screened overflow-water outlet and a suitably controlled drain-pipe, a pair of vertical shafts for which bearings are provided on the bottom of the tank, a frame mounted on said tank, depending sleeves for which the frame is provided with bearings and through which sleeves the shafts extend, blades connected in series to the shafts and sleeves to extend therefrom in opposite directions, and gearing by which said shafts and sleeves are rotated in opposite directions, the length and disposition of the blades being such that the series of same in connection with shafts pass one another twice in each revolution thereof alternately with a similar passing of the series in connection with sleeves.

3. A filter-pulp washer comprising a horizontally elliptical tank provided with a water inlet, screened overflow-water outlet and a suitably controlled drain-pipe, a pair of vertical shafts for which bearings are provided on the bottom of the tank, a frame mounted on said tank, depending sleeves for which the frame is provided with bearings and through which sleeves the shafts extend, blades connected in series to the shafts and sleeves to extend therefrom in opposite directions, and gearing by which said shafts and sleeves are rotated in opposite directions, the length and disposition of the blades being such that the series of same in connection with shafts pass one another twice in each revolution thereof alternately with a similar passing of the series in connection with sleeves.

4. A filter-pulp washer comprising a horizontally elliptical tank provided with a suitably controlled drain-pipe, a pair of vertical shafts for which bearings are provided on the bottom of the tank, a frame mounted on the tank, depending sleeves for which the frame is provided with bearings and through which sleeves the shafts extend, blades connected in series to the shafts and sleeves to extend therefrom in opposite directions, each blade being a bent flat strip and having the contour of an approximate rhomboid in side elevation, and gearing by which said shafts and sleeves are rotated in opposite directions, the length and disposition of the blades being such that the series of same in connection with shafts pass one another twice in each revolution thereof alternately with a similar passing of the series in connection with sleeves.

5. A filter-pulp washer comprising a horizontally elliptical tank provided with a gate-controlled drain-pipe, a pair of vertical shafts for which bearings are provided on the bottom of the tank, a frame mounted on said tank, depending sleeves for which the frame is provided with bearings and through which sleeves the shafts extend, blades connected in series to the shafts and sleeves to extend therefrom in opposite directions, and gearing by which said shafts and sleeves are rotated in opposite directions, the length and disposition of the blades being such that the series of same in connection with shafts pass one another twice in each revolution thereof alternately with a similar passing of the series in connection with sleeves.

6. A filter-pulp washer comprising a horizontally elliptical tank provided with a suitably controlled drain-pipe and overflow-water outlet, a horizontal flange within the tank, a strainer having packing support on the flange, a pair of vertical shafts for which bearings are provided on the bottom of the tank, a frame mounted on said tank, depending sleeves for which the frame is provided with bearings and through which sleeves the shafts extend, blades connected in series to the shafts and sleeves to extend therefrom in opposite directions, and gearing by which said shafts and sleeves are rotated in opposite directions, the length and disposition of the blades being such that the series of same in connection with shafts pass one another twice in each revolution thereof alternately with a similar passing of the series in connection with sleeves.

7. A filter-pulp washer comprising a horizontally elliptical tank provided with a suitably controlled drain-pipe, an upper channel and water-overflow pipes leading from the channel; a horizontal flange within the tank, a strainer having packing support on the flange, a pair of vertical shafts for which bearings are provided on the bottom of the tank, a frame mounted on said tank, depending sleeves for which the frame is provided with bearings and through which sleeves the shafts extend, blades connected in series to the shafts and sleeves to extend therefrom in opposite directions, and gearing by which said shafts and sleeves are rotated in opposite directions, the length and disposition of the blades being such that the series of same in connection with shafts pass one another twice in each revolution thereof alternately with a similar passing of the series in connection with sleeves.

In testimony that I claim the foregoing I have hereunto set my hand at Milwaukee in the county of Milwaukee and State of Wisconsin in the presence of two witnesses.

LOUIS SOCHUREK.

Witnesses:
 GEORGE G. FELBER,
 G. C. YOUNG.